(12) United States Patent
Kikuchi et al.

(10) Patent No.: US 6,292,461 B1
(45) Date of Patent: Sep. 18, 2001

(54) HUB-CHUCKING TYPE DISKLIKE RECORDING MEANS

(75) Inventors: Shuichi Kikuchi; Takatsugu Funawatari, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/936,463

(22) Filed: Sep. 24, 1997

(30) Foreign Application Priority Data

Sep. 30, 1996 (JP) .................................................. 8-257947

(51) Int. Cl.⁷ .......................... G11B 25/04; G11B 17/028
(52) U.S. Cl. ............................................. 369/290; 369/282
(58) Field of Search ..................................... 369/290, 282, 369/271, 270, 289; 360/133, 135

(56) References Cited

U.S. PATENT DOCUMENTS

| 2,694,578 | * | 11/1954 | Smith .............................. 369/290 X |
| 5,657,311 | * | 8/1997 | Takahashi ............................ 369/290 |
| 5,949,630 | * | 9/1999 | Yamamoto et al. ................. 360/133 |

FOREIGN PATENT DOCUMENTS 4-355253 * 12/1992 (JP) .

* cited by examiner

*Primary Examiner*—David L. Ometz
(74) *Attorney, Agent, or Firm*—Frommer Lawrence & Haug LLP.; William S. Frommer; Matthew K. Ryan

(57) ABSTRACT

A disk recording member includes a main body and a center hub mounted in a center hole of the main body. The center hub includes upper and lower hub components for holding upper and lower sides of the main body and a screw for connecting the upper and lower hub components.

14 Claims, 15 Drawing Sheets

ID DISKLIKE
HUB-CHUCKING TYPE DISKLIKE RECORDING MEANS

BACKGROUND OF THE INVENTION

The present invention relates to disklike recording means of the hub chucking type so called, i.e. disklike recording means fixed to disk tables of recording/reproducing devices through center hubs mounted in center holes of recording-means main bodies.

FIGS. 29–30 show one of the known hub-chucking type disklike recording means. Referring to FIGS. 29–30, a disklike recording means 101 includes a main body 102 having a signal recording face and a center hub 103 mounted in a center hole 102a of the main body 102.

The recording-means main body 102 is made of a rigid material such as synthetic resin or glass to be shaped like a disk having a center hole.

The center hub 103 is made of a magnetic metal plate such as iron plate to be shaped like a bottomed cylinder. The center hub 103 is formed with a flange 103a.

The center hub 103 is mounted to the recording-means main body 102 by inserting the cylinder 103b connected to the flange 103a in the center hole 102a of the main body 102, then joining the flange 103a to the upper side of the main body 102 by an adhesive 104.

Referring to FIG. 30, when inserting the disklike recording means 101 into a recording/reproducing device, the center hub 103 is attracted by a magnet 202 arranged to a disk table 201 30 of the device, so that the disklike recording means 101 is chucked or held on a hub support face 203 of the disk table 201.

However, due to its structure that the center hub 103 of a metal plate is joined to the recording-means main body 102 of a rigid material by the adhesive 104, the known disklike recording means 101 produces the following inconveniences:

First, the recording-means main body 102 and the center hub 103 having different thermal expansion coefficients are firmly joined to each other by the adhesive 104, so that when the disklike recording means 101 is exposed to an atmosphere of high temperature, the main body 102 will be warped or deformed due to the difference in the thermal expansion coefficient. With the disklike recording means 101 having high capacity based on high-density recording, such slight warp or deformation is sufficient to produce inconveniences such as inferior recording and reproducing.

Second, after solidification of the adhesive 104, the mounting position of the center hub 103 with respect to the recording-means main body 102 is difficult to be corrected.

It is, therefore, an object of the present invention to provide disklike recording means which produce no warp or deformation in the recording-means main body due to temperature rise, etc., and ensure easy correction of the mounting position of the center hub with respect to the recording-means main body.

SUMMARY OF THE INVENTION

According to one aspect of the present invention, there is provided a disklike recording means adapted to a recording and reproducing device having a table, comprising:

a main body having a center hole; and a center hub mounted in said center hole of said main body, said center hub including first and second components for holding first and second sides of said main body and means for connecting said first and second components, said center hub being magnetically chucked on the table.

Another aspect of the present invention lies in providing a disklike recording means adapted to a recording and reproducing device having a table, comprising:

a main body having a center hole;

a center hub mounted in said center hole of said main body, said center hub including first and second components for holding first and second sides of said main body and means for connecting said first and second components, said center hub being magnetically chucked on the table; and means for ensuring contact between said main body and said center hub.

DETAILED DESCRIPTION OF THE INVENTION

Figure 1:
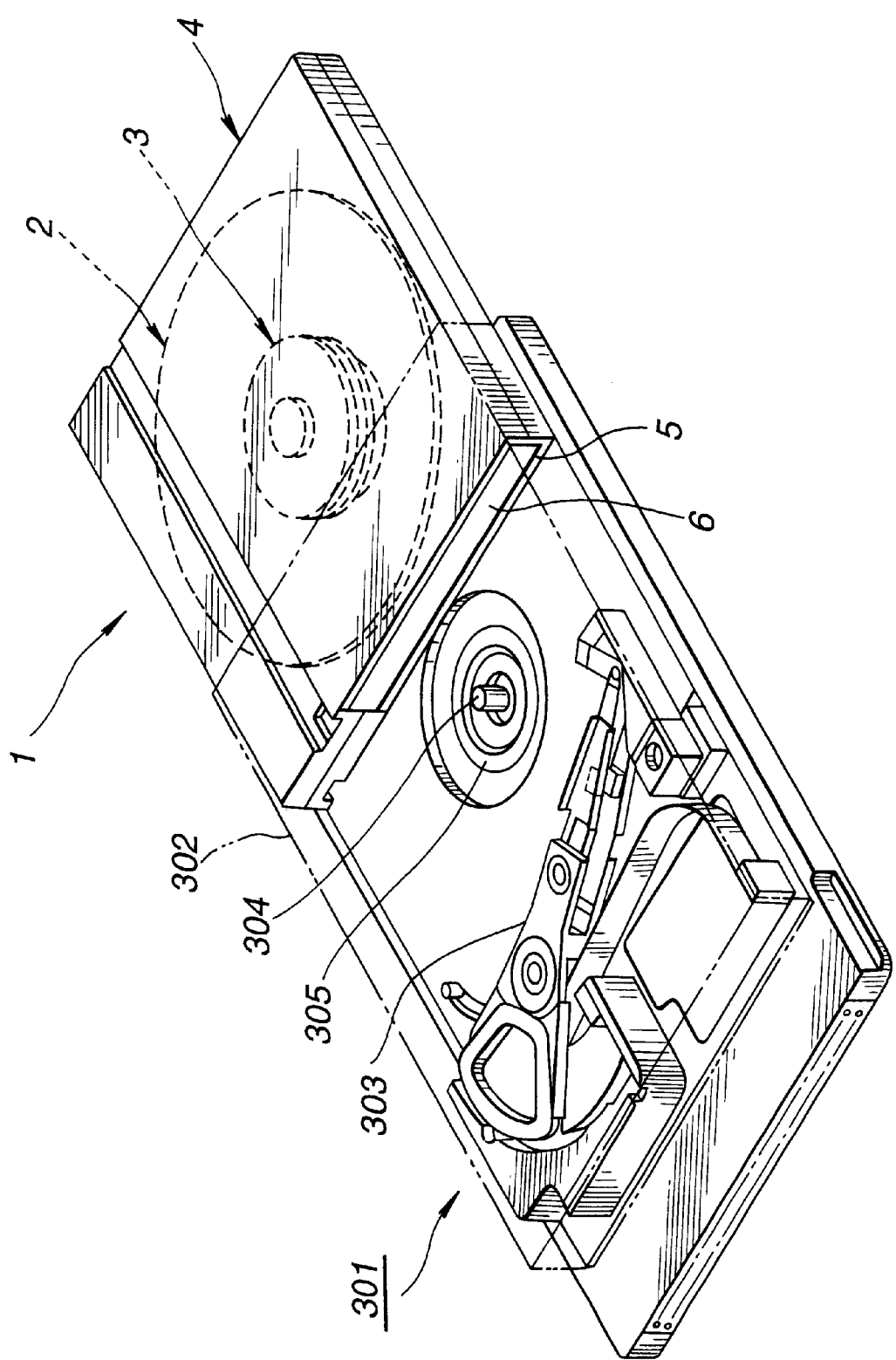
FIG. 1 is a perspective view showing a drive and a disk to which the present invention is applied.

Referring to the drawings wherein like reference numerals designate like parts throughout the views, preferred embodiment of disklike recording means according to the present invention will be described.

Figure 2:
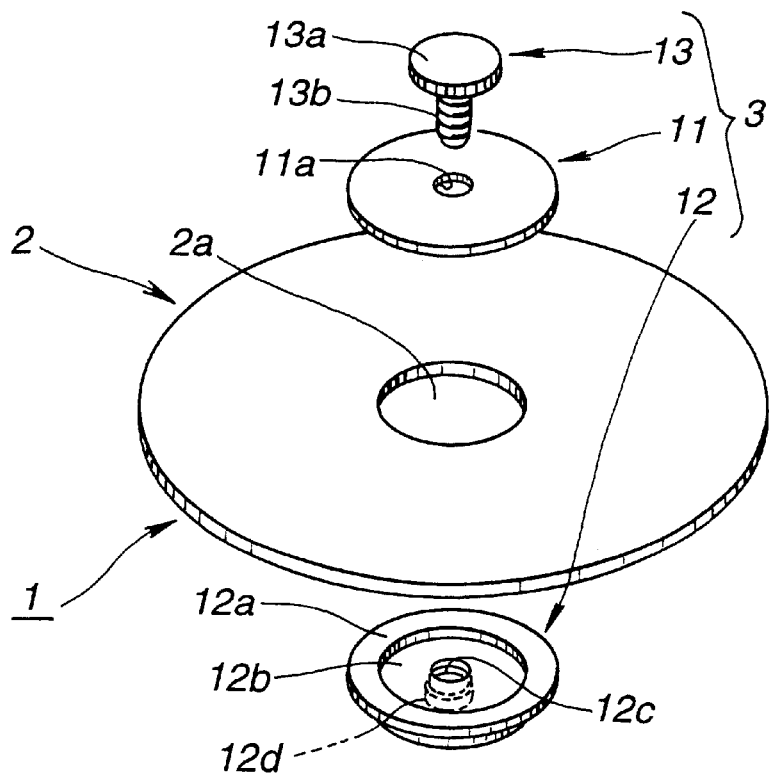
FIG. 2 is an exploded perspective view showing a first embodiment of a disk according to the present invention.
Figure 3:
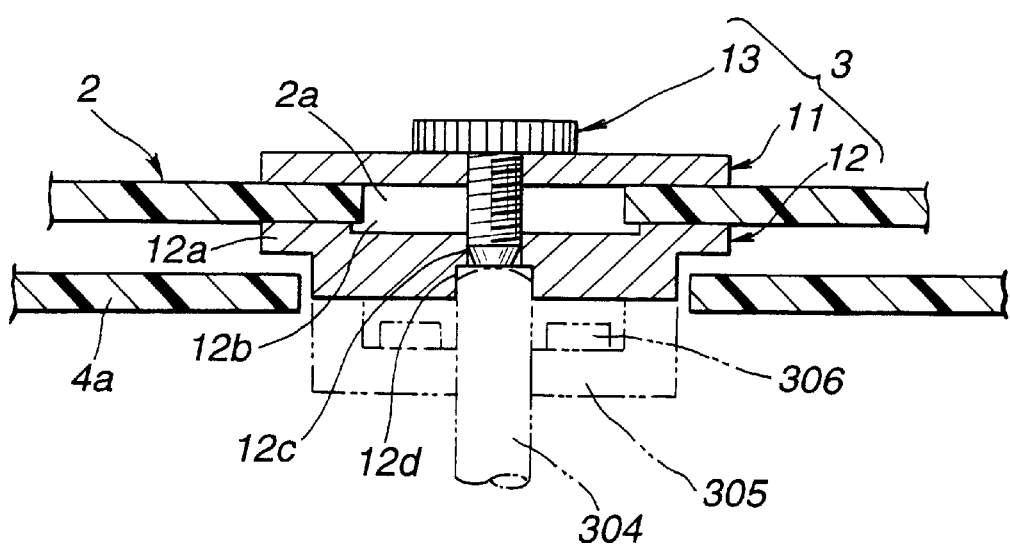
FIG. 3 is a sectional view showing the disk of FIG. 2.

FIGS. 1–3 shows a first embodiment of the present invention. Referring to FIG. 1, a disklike recording means or disk 1 comprises a main body 2 and a center hub 3 mounted to the recording-means or disk main body 2 in the center. The disklike recording means 1 is rotatably accommodated in a cartridge or casing 4. The cartridge 4 has a head insertion opening formed in the front end. A shutter 6 is rotatably mounted to the opening 5.

When inserting the cartridge 4 into a cartridge compartment 302 of a recording/reproducing device or drive 301, the shutter 6 is opened by a shutter opener, not shown, arranged to the drive 301 to allow a pointed end of a rotating actuator 303 of the drive 301 to enter the cartridge 4 by the opening 5. Referring to FIG. 3, when the cartridge 4 is completely loaded in the cartridge compartment 302, a disk table 305 mounted to a spindle 304 is vertically moved to enter the cartridge 4 by a spindle insertion opening formed in the bottom. Then, the disk table 305 attract the center hub 3 by the magnet 306 to chuck the disk 1 thereon, and puts the disk 1 in the rotatable state by making the center hub 3 floated from a lower half 4a of the cartridge 4.

Referring to FIG. 2, the disk main body 2 is made of a rigid material such as synthetic resin such as polycarbonate, polystyrene, polyolefin, norbornane, or poly(methyl methacrylate), aluminum, or glass to be shaped like a disk of about 0.5–3.0 mm thickness. The disk main body 2 has a center hole 2a, and a recording layer of the magnetic, magneto-optical, or optical type formed on the main plane.

The center hub 3 comprises a pair of upper and lower hub components 11, 12 for holding the upper and lower sides of the disk main body 2, and a screw or connecting means 13 for connecting the upper and lower hub components.

The upper hub components 11 is formed like a disk of diameter larger than that of the center hole 2a of the disk main body 2, and has in the center a screw insertion hole 11a of diameter smaller than that of a head 13a of the screw 13 and larger than that of a shank 13b thereof.

The upper hub component 11 cooperates with the lower hub component 12 to hold the disk main body 2 therebetween through the screw 13. In order to prevent easy deformation when driving the screw 13, the upper hub component 11 is formed by stamping-out of a metal plate of relatively high mechanical strength such as SUS304 and having 0.1–0.5 mm thickness, or by injection molding of synthetic resin of excellent mechanical strength such as polycarbonate.

The lower hub component 12, which cooperates with the upper hub component 11 to hold the disk main body 2 as described above, is shaped like a disk in the same way as the upper hub component 11. The lower hub component 12 has an annular disk support 12a formed on the outermost periphery of the upper side to support the lower side of the disk main body 2, and a recess 12b formed on the inner periphery of the disk support 12a and having the bottom which abuts on the disk table 305 of the drive 301. A screw hole 12c is formed in the center of the upper side of the bottom of the recess 12b, whereas a spindle' insertion hole 12d is formed in the center of the lower side to receive a pointed end of the spindle 304 of the drive 301.

For attraction by the magnet 306 of the disk table 305, the lower hub component 12 is formed by machining of a magnetic metal plate such as SUS430.

When disposing the upper and lower hub components 11, 12 on the upper and lower sides of the center of the disk main body 2, inserting the shank 13b of the screw 13 into the screw insertion hole 11a of the upper hub component 11 to arrange a pointed end of the shank 13b through the center hole 2a of the disk main body 2, and engaging the screw 13 with the screw hole 12c of the lower hub component 12, the disk main body 2 is held between the upper and lower hub components 11, 12 with the center hub 3 mounted in the center of the disk main body 2.

According to the first embodiment, even it a difference in thermal expansion amount is produced between the disk main body 2 and the center hub 3 made of materials having different thermal expansion coefficients and exposed to high temperature, a slippage occurs between the two, preventing a warp or deformation of the disk main body 2.

Figure 4:
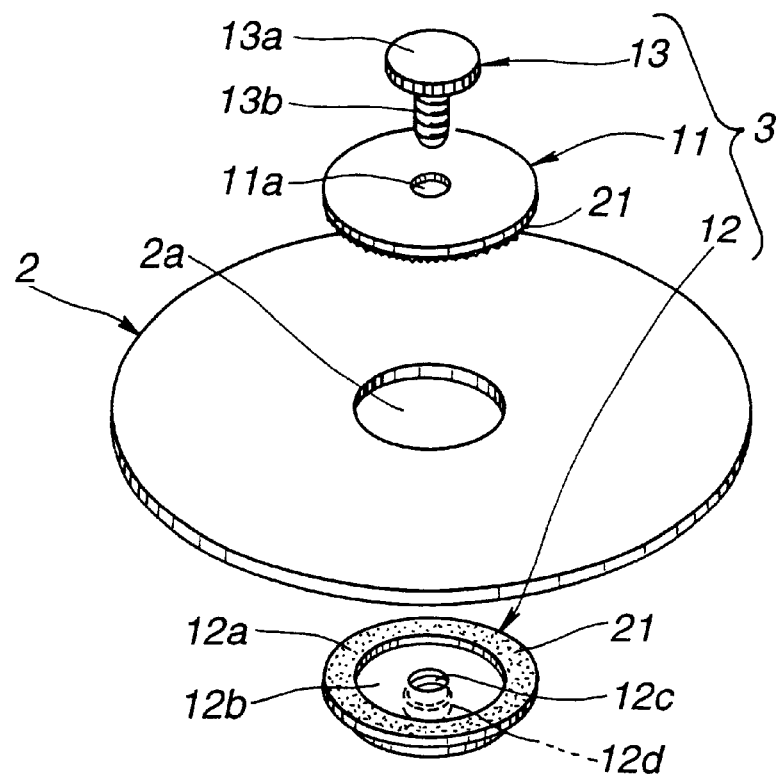
FIG. 4 is a view similar to FIG. 2, showing a second embodiment of the present invention.
Figure 5:
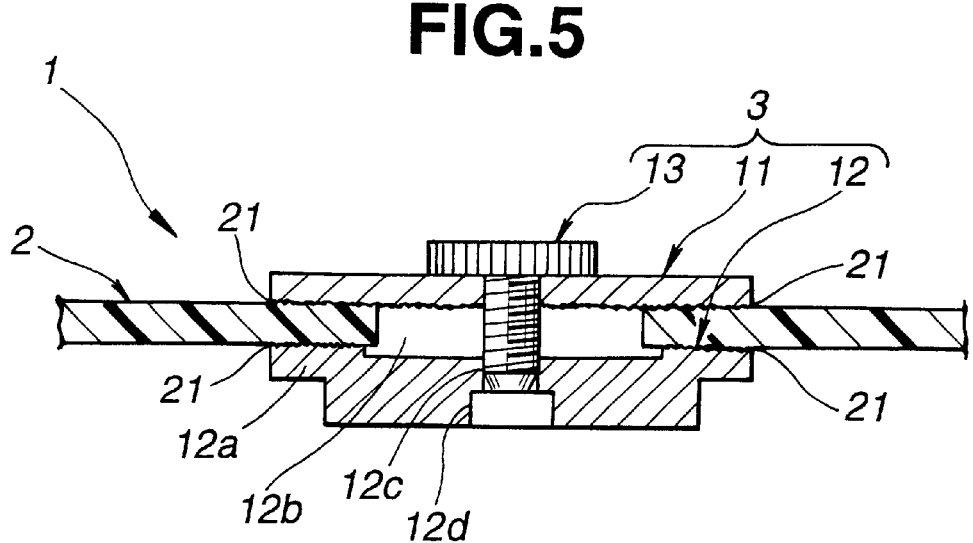
FIG. 5 is a view similar to FIG. 3, showing the disk of FIG. 4.

FIGS. 4–5 shows a second embodiment of the present invention wherein slippage restrainers 21 are arranged on contact surfaces between the disk main body 2 and the upper and lower hub components 11, 12. The slippage restrainers 21 serve to prevent a needless slippage (which occurs, e.g. without being exposed to high temperature) between the disk main body 2 and the upper and lower hub components 11, 12, thereby preventing a positional displacement, etc. of the hub components 11, 12 with respect to the disk main body 2. The slippage restrainers 21 include a roughened surface obtained, e.g. by knurling the contact surface.

Figure 6:
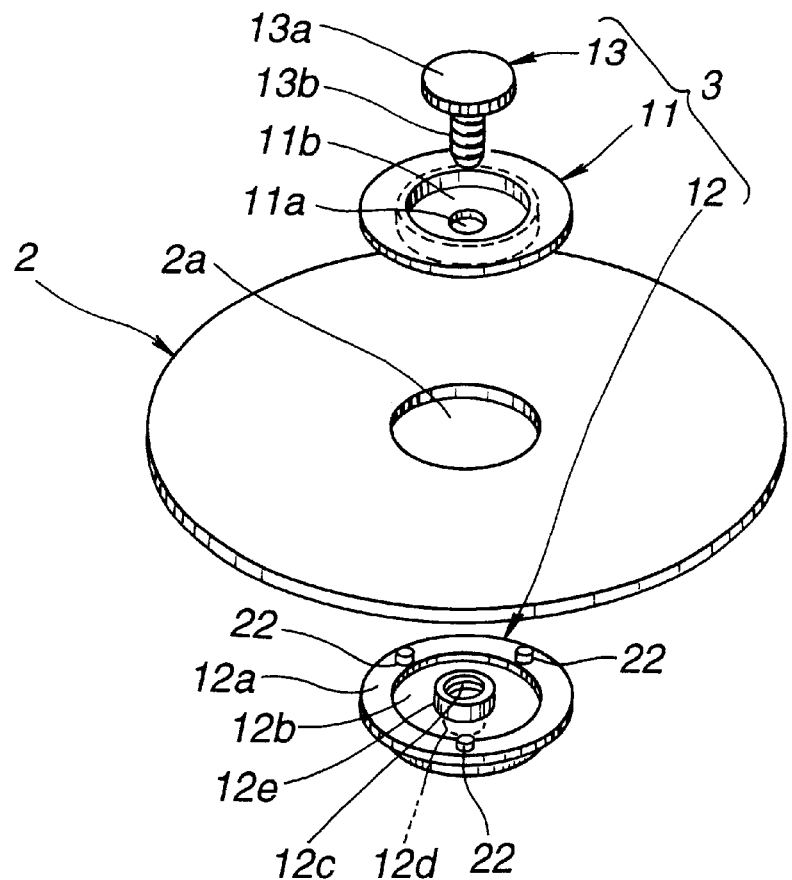
FIG. 6 is a view similar to FIG. 4, showing a third embodiment of the present invention.
Figure 7:
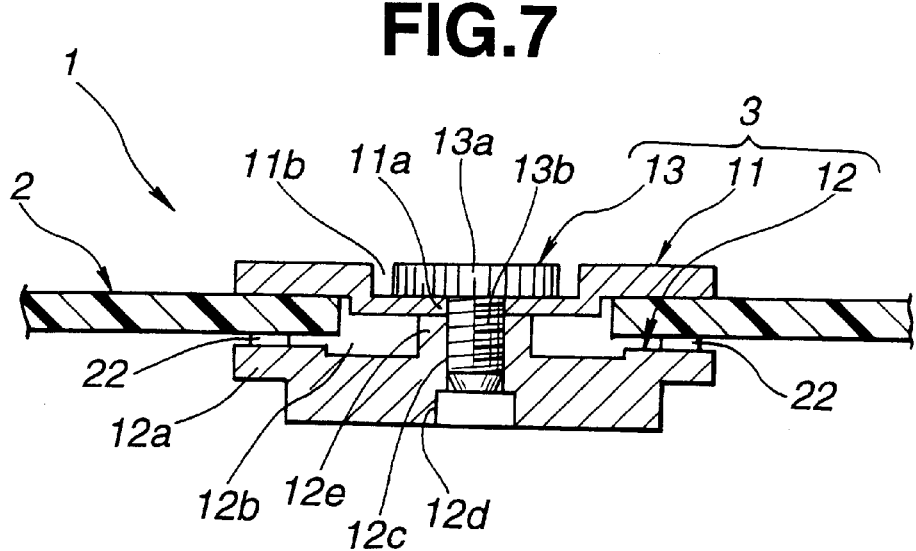
FIG. 7 is a view similar to FIG. 5, showing the disk of FIG. 6.

FIGS. 6–7 show a third embodiment of the present invention wherein the contact surface of the lower hub component 12 with the disk main body 2 includes end faces of three protrusions 22 arranged on the annular disk support 12a of the lower hub component 12. The protrusions 22 are formed on the upper side of the annular disk support 12a and on the same circumference defined about the screw hole 12c as the center at angular intervals of 120°.

The center of the lower hub component 12 includes a thick wall portion 12e having the screw hole 12c formed in the upper side and the spindle insertion hole 12d formed in the lower side. A recess 11b for receiving the head 13a of the screw 13 is formed in the upper side of the upper hub component 11 to enclose the screw insertion hole 11a.

When holding the upper and lower sides of the disk main body 2 between the upper and lower hub components 11, 12, and connecting the hub components 11, 12 by the screw 13, the disk main body 2 is disposed on the end faces of the protrusions 22 of the lower hub component 12 as shown in FIG. 7.

According to the third embodiment, equalization of the height of the end faces of the protrusions 22 enables an improvement in the positional accuracy of the disk main body 2 disposed on the end faces of the protrusions 22, resulting in easy improvement in the facial accuracy of the contact face with the disk main body 2 compared with the structure of supporting the disk main body 2 by the whole upper side of the annular disk support 12a of the lower hub component 12.

The protrusions 22 are integrated with the lower hub component 12. The number of protrusions 22 may be four or more in place of three. When forming annularly, the number of protrusions 22 may be one.

Figure 8:
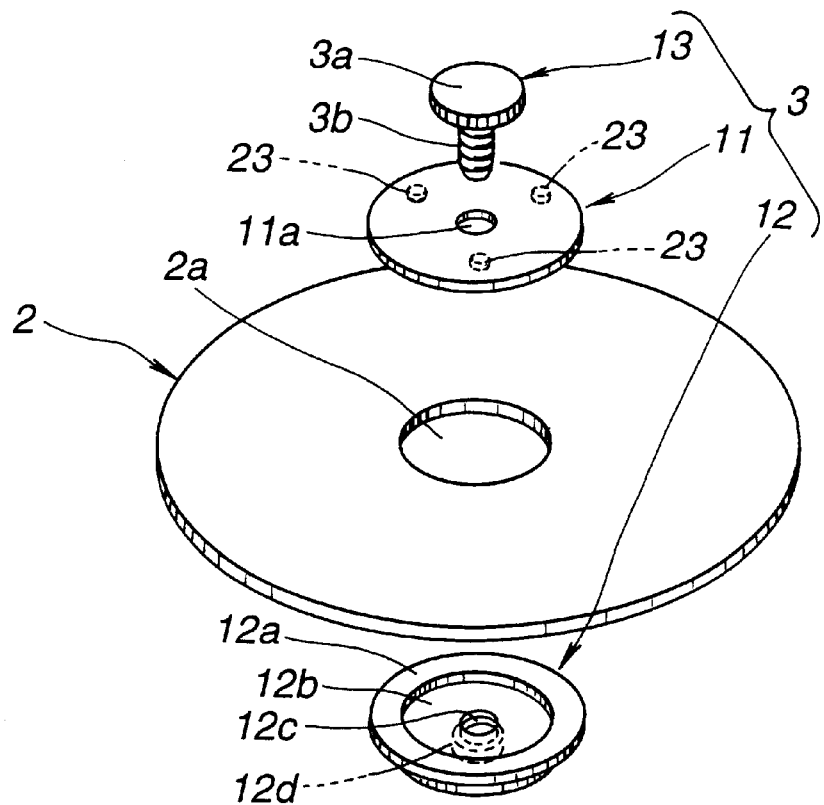
FIG. 8 is a view similar to FIG. 6, showing a fourth embodiment of the present invention.
Figure 9:
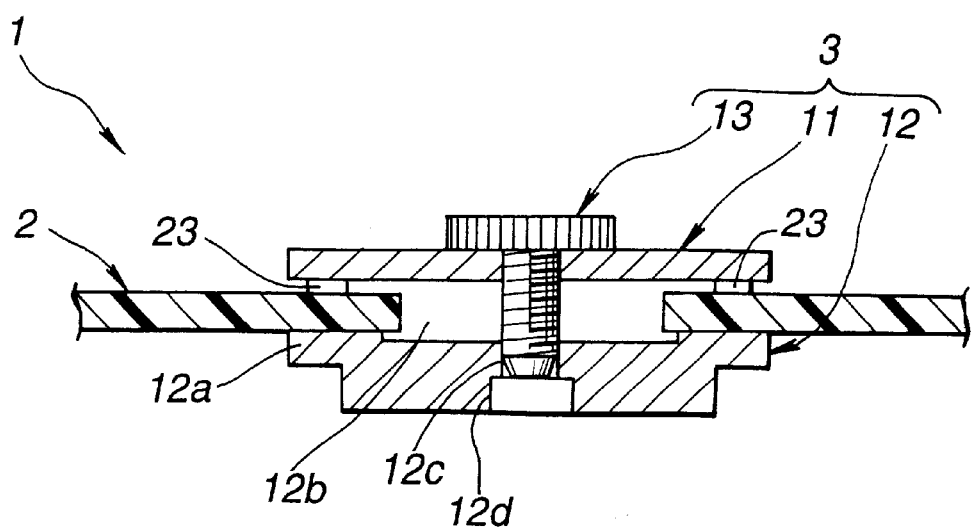
FIG. 9 is a view similar to FIG. 7, showing the disk of FIG. 8.

FIGS. 8–9 show a fourth embodiment of the present invention wherein the contact surface of the upper hub component 11 with the disk main body 2 includes end faces of three protrusions 23 arranged to the upper hub component 11 on the face opposite to the disk main body 2. The protrusions 23 are formed on the face opposite to the disk main body 2 and on the same circumference defined about the screw hole 12c as the center at angular intervals of 120°.

According to the fourth embodiment, in the same way as the third embodiment, the end faces of the protrusions 23 can have equalized height, and contact equally the disk main body 2 at three points when holding the disk main body 2 between the upper and lower hub components 11, 12. A holding force is concentrated on the protrusions 23, enabling sure and firm holding of the disk main body 2.

Figure 10:
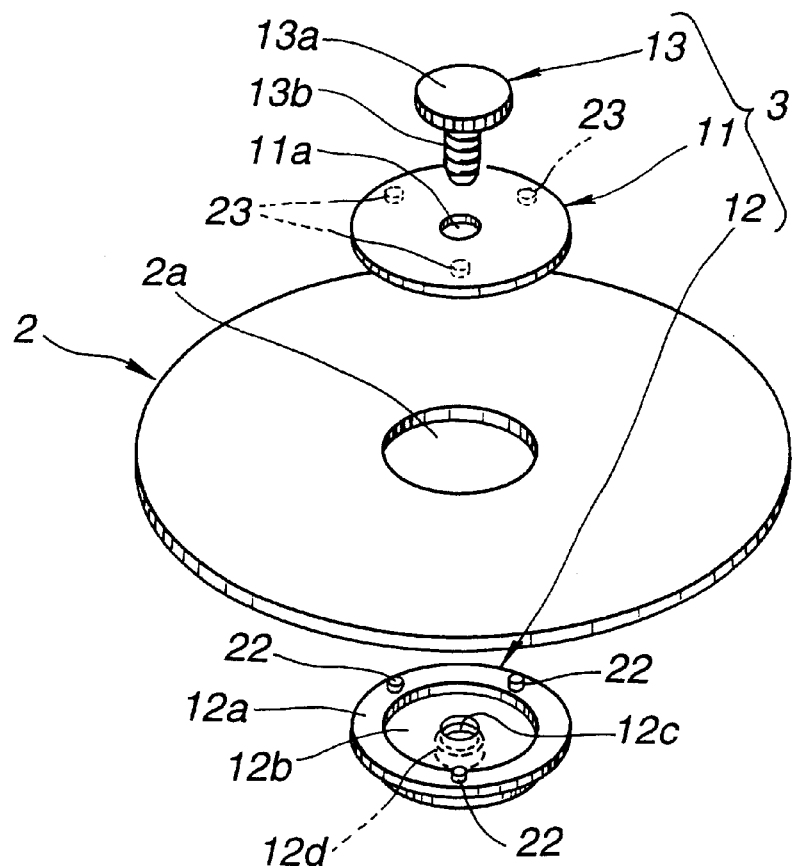
FIG. 10 is a view similar to FIG. 8, showing a fifth embodiment of the present invention.
Figure 11:
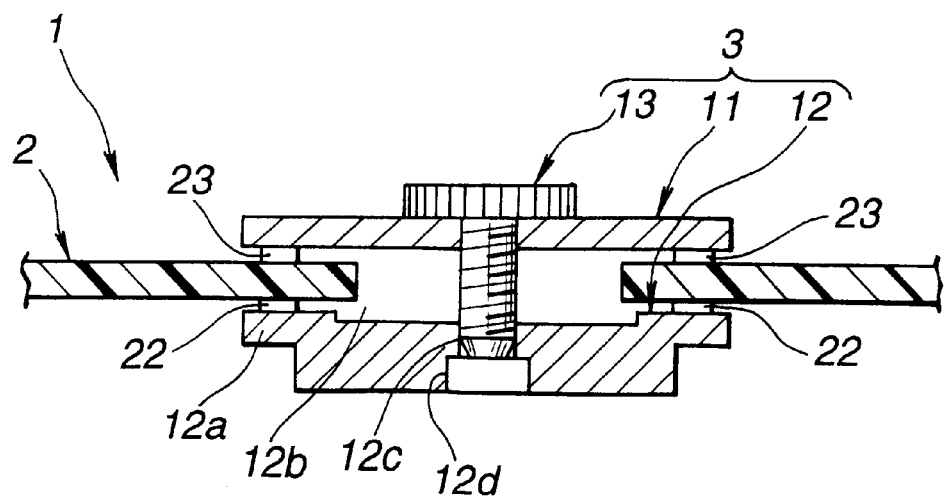
FIG. 11 is a view similar to FIG. 9, showing the disk of FIG. 10.

FIGS. 10–11 show a fifth embodiment of the present invention which is a combination of the third and fourth embodiments. In the fifth embodiment, the contact surface of the lower hub component 12 includes the end faces of the three protrusions 22 formed on the annular disk support 12a of the lower hub component 12 at angular intervals of 120°. On the other hand, the contact surface of the upper hub component 11 with the disk main body 2 includes the three protrusions 23 formed on the face opposite to the disk main body 2.

The protrusions 22 of the lower hub component 12 and the protrusions 23 of the upper hub component 11 are arranged to face each other to hold the disk main body 2 therebetween.

According to the fifth embodiment, not only the protrusions 22 of the lower hub component 12 contribute to an improvement in the positional accuracy of the disk main body 2, but a combination of the protrusions 22 and the protrusions 23 enables surer and firmer holding of the disk main body 2 than that in the fourth embodiment.

Figure 12:
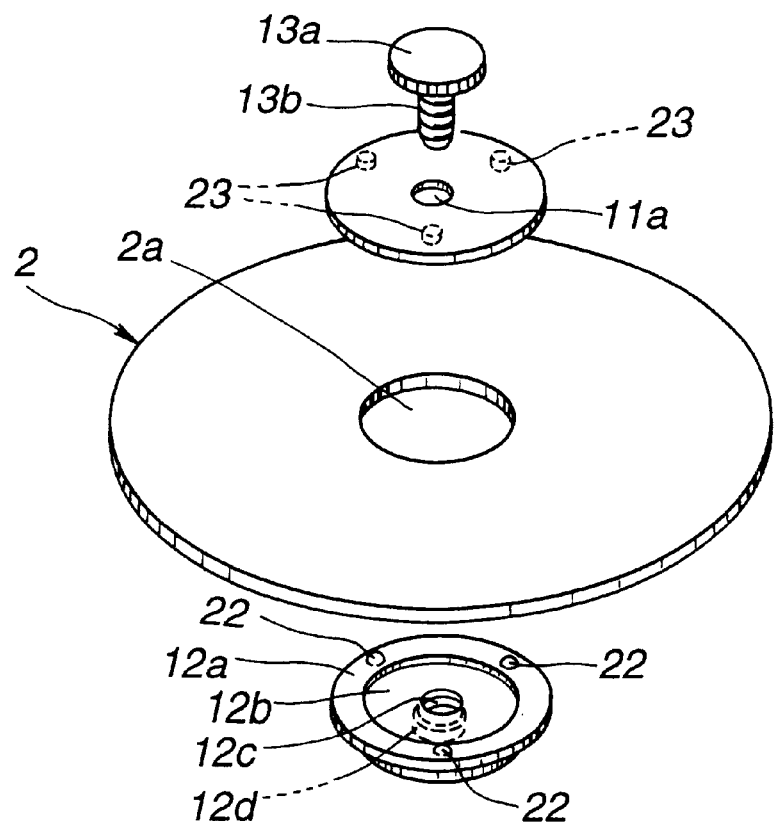
FIG. 12 is a view similar to FIG. 10, showing a sixth embodiment of the present invention.
Figure 13:
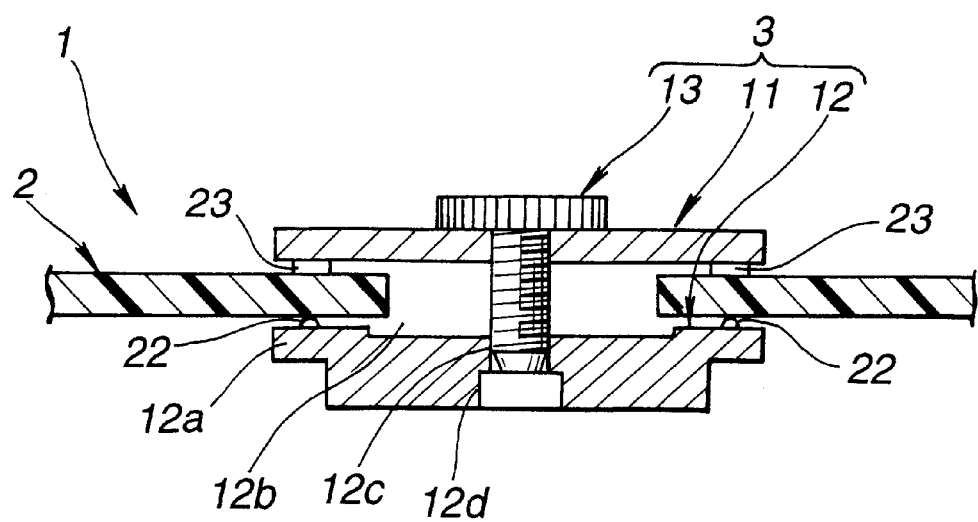
FIG. 13 is a view similar to FIG. 11, showing the disk of FIG. 12.

FIGS. 12–13 show a sixth embodiment of the present invention wherein the size and shape of the protrusions 22 of the lower hub component 12 and the protrusions 23 of the upper hub component 11 are determined so that the area of the end faces of the upper hub component 11 contacting the disk main body 2 is greater than the area of the end faces of the protrusions 22 contacting the disk main body 2.

Figure 14:
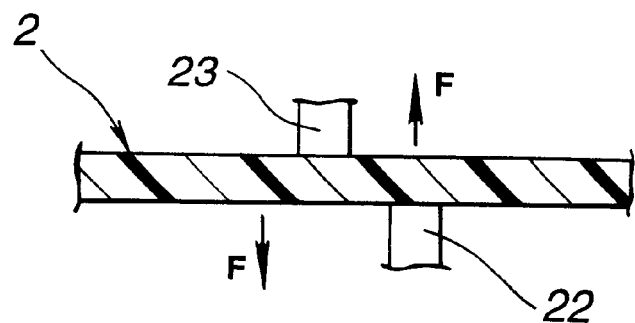
FIG. 14 is a schematic section explaining an inconvenience.

Referring to FIG. 14, if the protrusion 22 and the protrusion 23 do not face each other, a force F is produced to warp or deform the disk main body 2. In order to prevent occurrence of the force F, the protrusions 22 and the protrusions 23 need to correctly face each other, which requires the positional accuracy thereof, resulting in cost increase.

In view of such inconvenience, in the sixth embodiment, the protrusions 23 of the upper hub component 11 are formed to be larger than the protrusions 22 of the lower hub component 12. Thus, even with some positional displacement, the protrusions 23 can easily face the protrusions 22 due to enlargement of the protrusions 23. In the sixth embodiment, the protrusions 23 of the upper hub component 11 are formed like a cylinder, and have ends face-contacting the upper side of the disk main body 2, whereas the protrusions 22 of the lower hub component 12 are formed like a semi-sphere, and have ends point-contacting the lower side of the disk main body 2, obtaining the contact area of the protrusions 23 of the upper hub component 11 with the disk main body 2 larger than that of the protrusions 22 of the lower hub component 12 with the disk main body 2. Alternatively, both the protrusion 22 and the protrusion 23 may be formed like a cylinder or a prism, and be varied in thickness to obtain the difference in the contact area.

Figure 15:
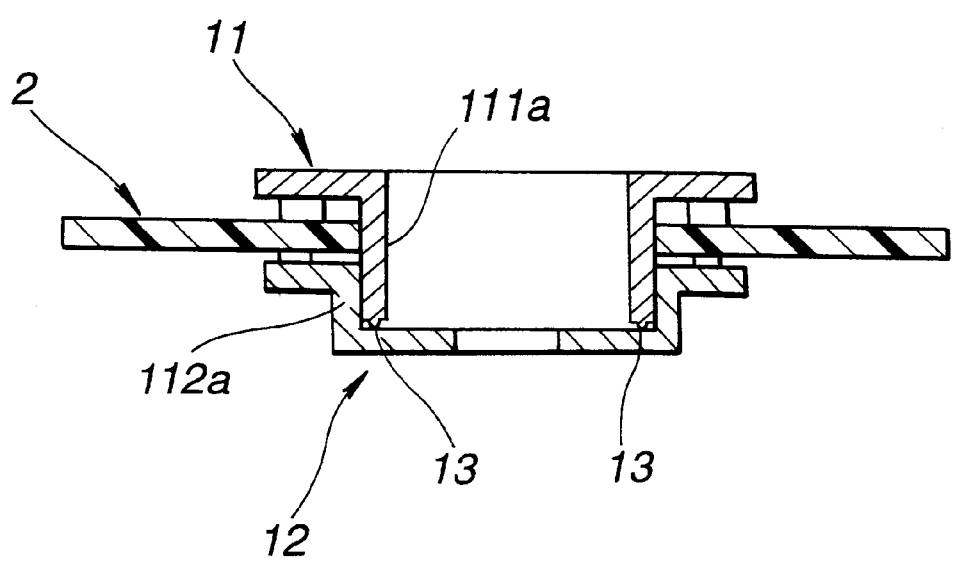
FIG. 15 is a view similar to FIG. 13, showing a variant of the sixth embodiment.

FIG. 15 shows a variant of the sixth embodiment wherein with the disk 1 having the protrusions 23 of the upper hub component 11 larger than the protrusions 22 of the lower hub component 12, the connecting means 13 of the upper and lower hub components 11, 12 include welding or bonding in place of the screw. A cylinder 111a of the upper hub component 11 is engaged with a cylinder 112a of the lower hub component 12, which is joined by spot welding or bonding, obtaining the upper and lower hub components 11, 12 connected to each other with the upper and lower sides of the disk main body 2 held therebetween.

In the sixth embodiment, the contact area of the protrusions 23 of the upper hub component 11 with the disk main body 2 is larger than that of the protrusions 22 of the lower hub component 12 with the disk main body 2. Alternatively, the contact area of the protrusions 22 of the lower hub component 12 may be larger than that of the protrusions 23 of the upper hub component 11.

Figure 16:
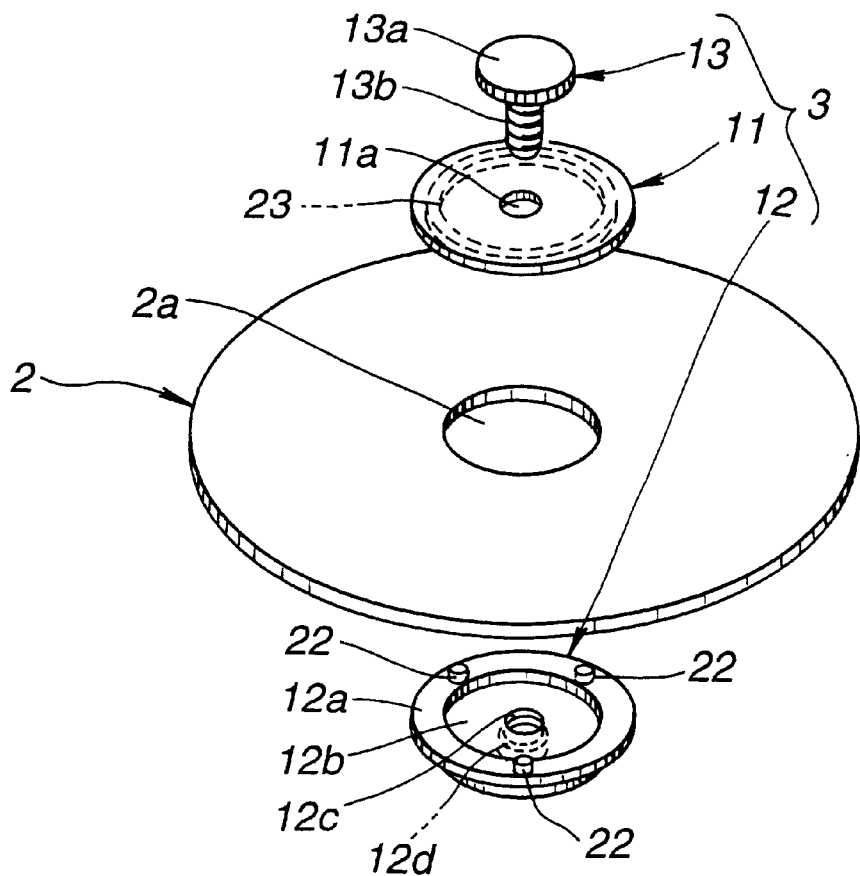
FIG. 16 is a view similar to FIG. 12, showing a seventh embodiment of the present invention.
Figure 17:
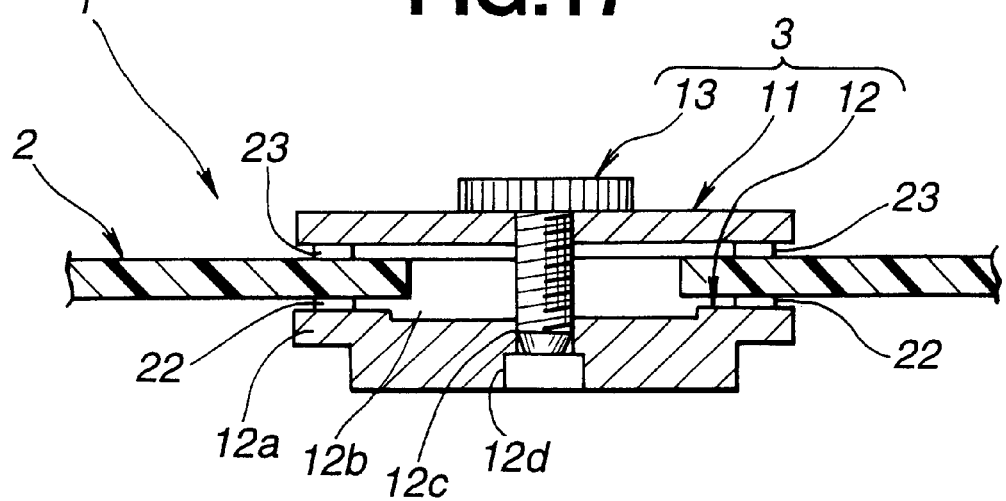
FIG. 17 is a view similar to FIG. 15, showing the disk of FIG. 16.

FIGS. 16–17 show a seventh embodiment of the present invention wherein at least one of the protrusion 22 of the lower hub component 12 and the protrusion 23 of the upper hub component 11 is formed like an annulus or ring. The protrusion 23 of the upper hub component 11 is formed annularly, whereas the protrusions 22 of the lower hub component 12 are formed on the same circumference defined about the screw hole 12c and the spindle insertion hole 12d at angular intervals of 120°.

According to the seventh embodiment, even with circumferential displacement of the protrusions 22 of the lower hub component 12, the protrusions 22 and the annular protrusion 23 always face each other.

In the seventh embodiment, the protrusion 23 of the upper hub component 11 is formed annularly. Alternatively, the protrusion 22 of the lower hub component 12 may be formed annularly, or both the protrusion 22, 23 may be formed annularly.

Figure 18:
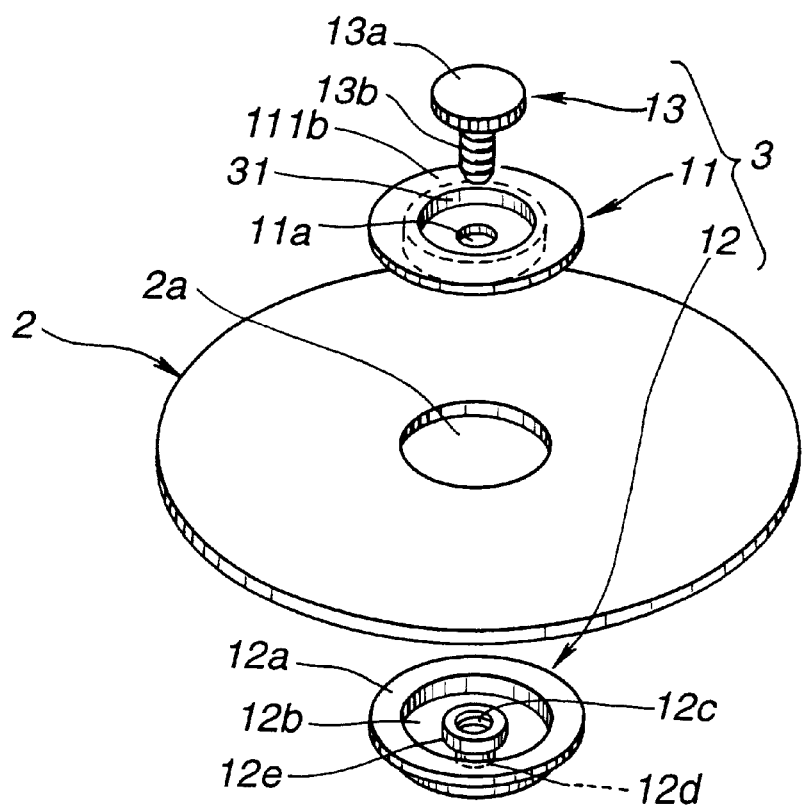
FIG. 18 is a view similar to FIG. 12, showing an eighth embodiment of the present invention.
Figure 19:
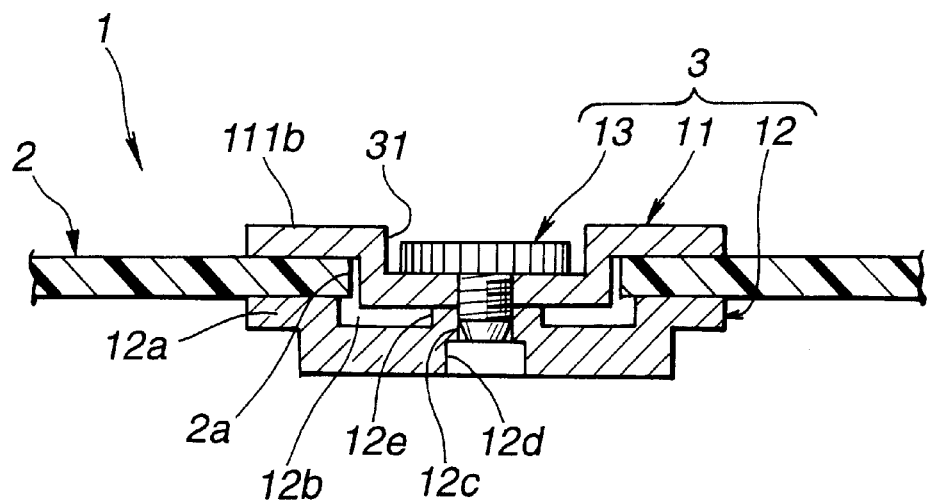
FIG. 19 is a view similar to FIG. 17, showing the disk of FIG. 18.

FIGS. 18–19 show an eighth embodiment of the present invention wherein the upper hub component 11 includes on the inner periphery of an annular support surface 111b a bottomed cylindrical protrusion 31 which expands to the lower side to engage with the center hole 2a. The center of the bottom of the protrusion 31 is formed with the screw insertion hole 11a.

The protrusion 31 is slightly smaller in diameter than the center hole 2a of the disk main body 2 to engaged therewith with a predetermined play or clearance. The protrusion 31 has a lower end which protrudes from the lower side of the disk main body 2 to enter the recess 12b of the upper side of the lower hub component 12 with a predetermined play or clearance.

The lower hub component 12 has the annular disk support 12a formed on the outermost periphery of the upper side to support the lower side of the disk main body 2, and the recess 12b formed on the inner periphery of the disk support 12a and receiving an end of the protrusion 31 of the upper hub component 11. The innermost periphery of the lower hub component 12 includes the thick wall portion 12e having the screw hole 12c formed in the center of the upper side and the spindle insertion hole 12d formed in the center of the lower side.

Thus, the upper hub component 11 is disposed to the upper side of the disk main body 2 with the protrusion 31 inserted in the center hole 12a, and the lower hub component 12 is disposed to the lower side of the disk main body 2 with the end of the protrusion 31 inserted in the recess 12b of the upper hub component 12, which are then connected by the screw 13, obtaining the disk 1.

According to the eighth embodiment, the protrusion 31 of the upper hub component 11 is inserted in the center hole 2a of the disk main body 2 to have the end inserted in the recess 12b of the lower hub component 12, resulting in easy positioning of the disk main body 2, the upper hub component 11, and the lower hub component 12. Moreover, the protrusion 31 is inserted in the center hole 2a with a predetermined play or clearance, so that when the disk main body 2 expands thermally, the inner peripheral surface of the center hole 2a closely contacts the outer peripheral surface of the protrusion 31, preventing a warp or deformation of the disk main body 2.

Figure 20:
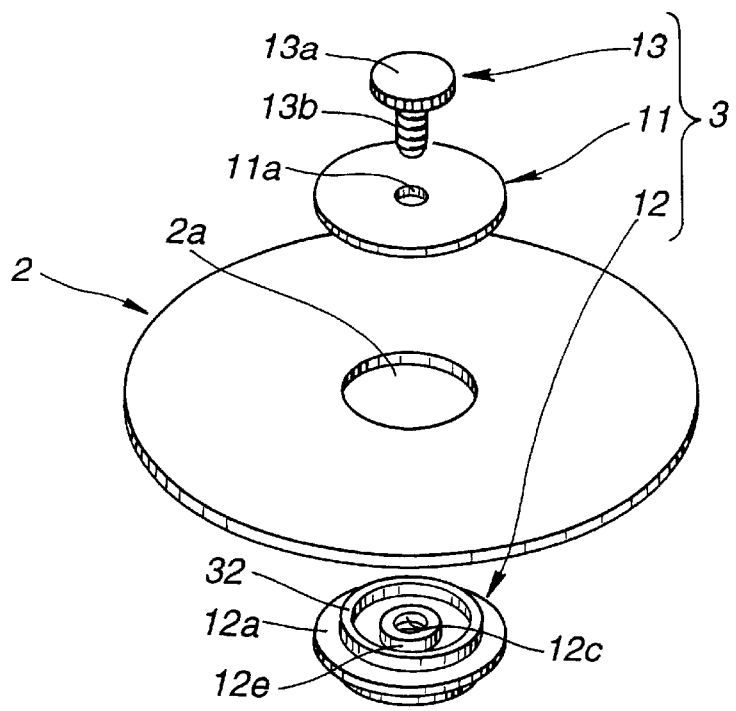
FIG. 20 is a view similar to FIG. 18, showing a ninth embodiment of the present invention.
Figure 21:
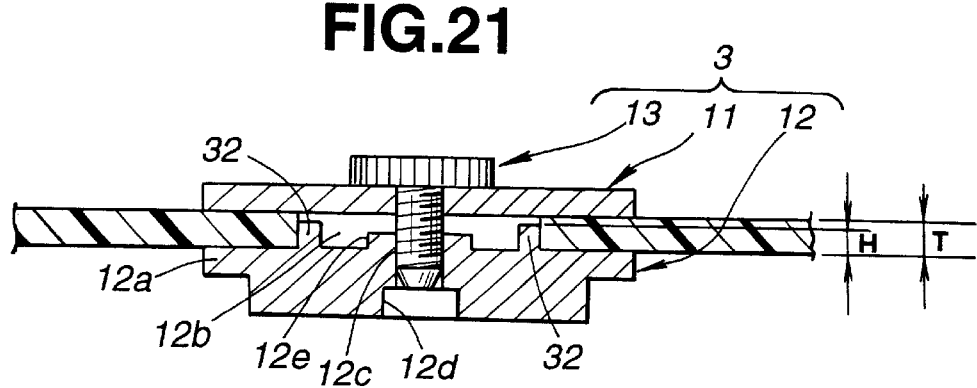
FIG. 21 is a view similar to FIG. 19, showing the disk of FIG. 20.

FIGS. 20–21 show a ninth embodiment of the present invention wherein an annular protrusion 32 is arranged on the inner periphery of the disk support 12a formed in the upper side of the lower hub component 12. The protrusion 32 has the diameter slightly smaller than that of the center hole 2a of the disk main body 2, and the height H slightly smaller than the thickness T of the disk main body 2. The lower hub component 12 is disposed to the lower side of the disk main body 2 with the protrusion 32 inserted in or loosely engaged with the center hole 2a, and it is then connected to the upper hub component 11 by the screw 13, obtaining the center hub 3.

Figure 22:
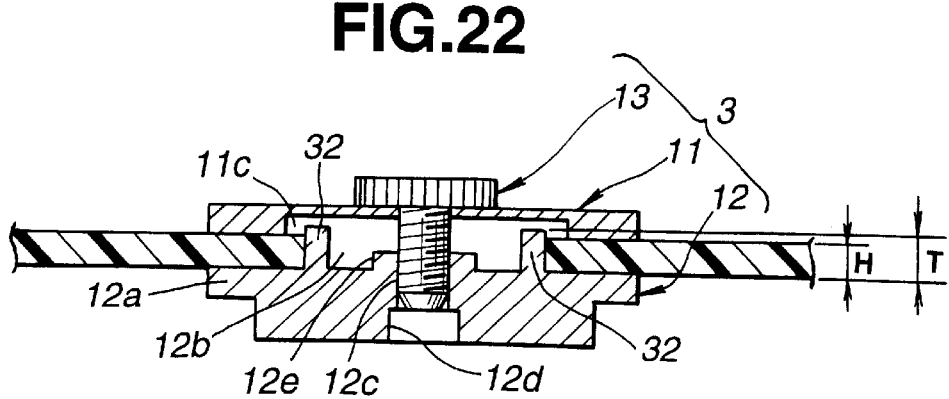
FIG. 22 is a view similar to FIG. 21, showing a variant of the ninth embodiment.

FIG. 22 shows a variant of the ninth embodiment. In the variant, the height H of the protrusion 32 is greater than the thickness T of the disk main body 2, so that when inserted in the center hole 2a of the disk main body 2, the protrusion 32 has an end protruding from the upper side of the disk main body 2. On the other hand, the lower side of the upper hub component 11 is formed with a recess 11c engaged with the end of the protrusion 32. Engagement of the protrusion 32 with the recess 11c enables loose positioning of the upper and lower hub components 11, 12.

Figure 23:
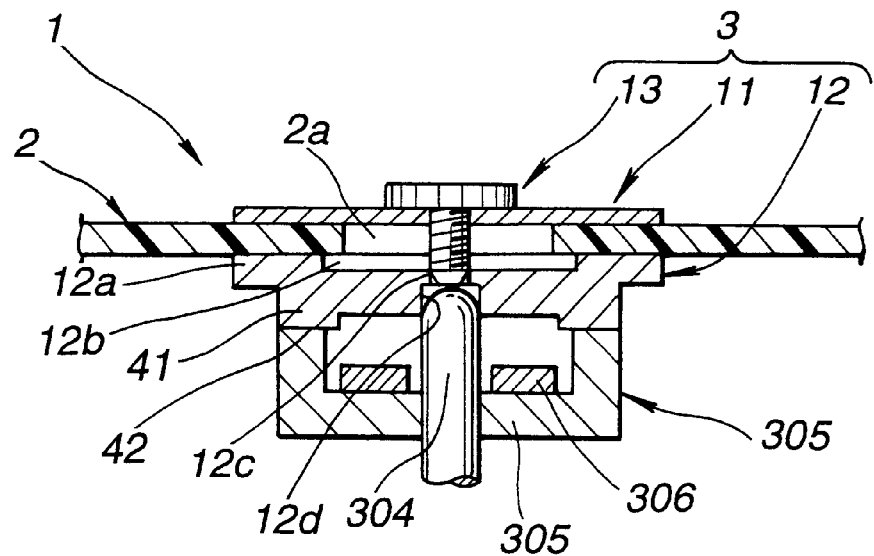
FIG. 23 is a view similar to FIG. 22, showing a tenth embodiment of the present invention.

FIG. 23 shows a tenth embodiment of the present invention wherein an annular protrusion 41 is arranged on the outer periphery of the lower side of the lower hub component 12, and has an end face 42 which abuts on the disk table 305 of the drive 301. This structure enables an improvement in the plane accuracy of the end face 42, resulting in improved chucking thereof to the disk table 305.

Figure 24:
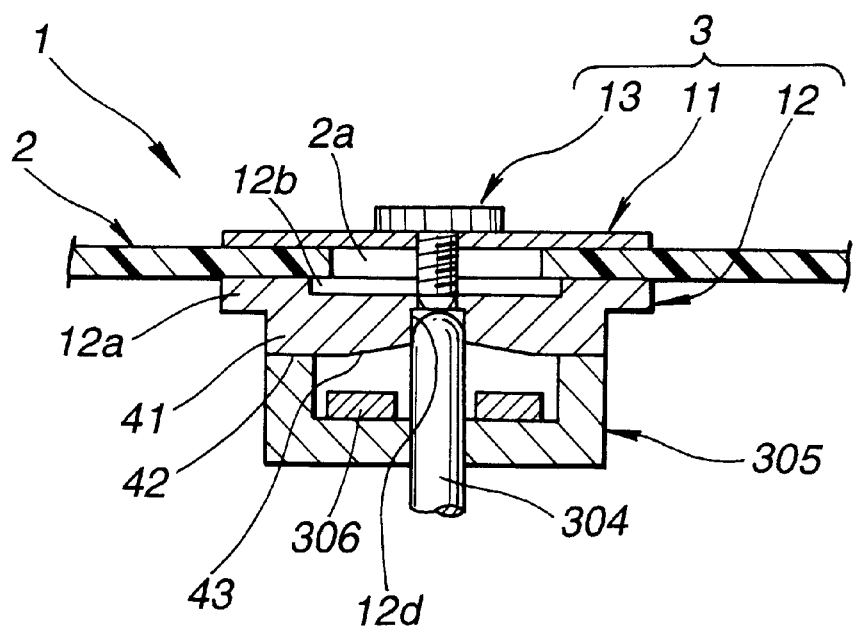
FIG. 24 is a view similar to FIG. 23, showing a variant of the tenth embodiment.

FIG. 24 shows a variant of the tenth embodiment wherein an inverse conical slant face 43 is formed from the end face 43 of the protrusion 41 to the spindle insertion hole 12d to enable easy introduction of the pointed end of the spindle 304 of the drive 301 into the spindle insertion hole 12d.

Figure 25:
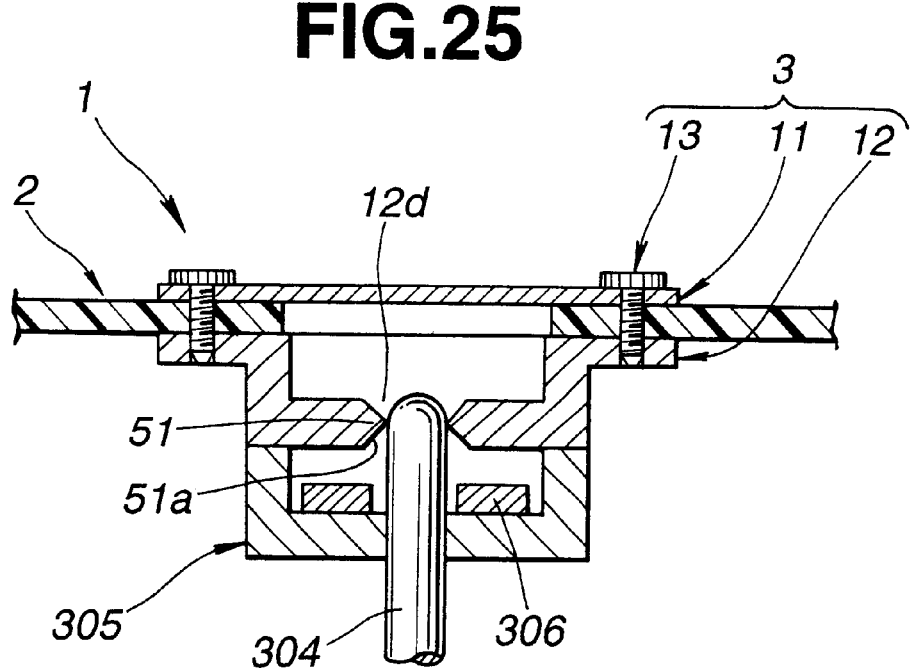
FIG. 25 is a view similar to FIG. 24, showing an eleventh embodiment of the present invention.

FIG. 25 shows an eleventh embodiment of the present invention wherein an annular protrusion 51 is arranged on an inner peripheral wall of the spindle insertion hole 12d to have an end contacting the outer peripheral surface of the spindle 304. Thus, when inserting the spindle 304 into the spindle insertion hole 12d, the protrusion 51 comes in substantially line contact with the outer peripheral surface of the spindle 304, obtaining positioning thereof with high accuracy.

The lower side of the protrusion 51 is formed with a slant face 51a so as not to interrupt insertion of the spindle 30 into the spindle insertion hole 12d. The slant face 51a enables smooth introduction of the spindle 304 into an annulus of the protrusion 51.

Figure 26:
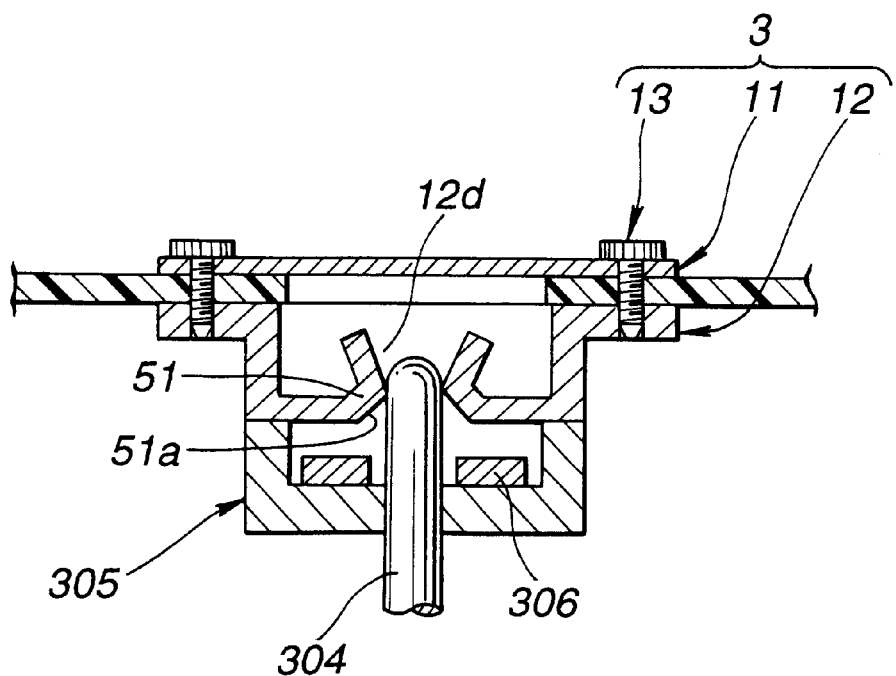
FIG. 26 is a view similar to FIG. 25, showing a variant of the eleventh embodiment.

FIG. 26 shows a variant of the eleventh embodiment wherein the spindle insertion hole 12d is formed by cylindrically bending a metal plate of the lower hub component 12, having a reduced diameter portion which serves as the annular protrusion 51.

Figure 27:
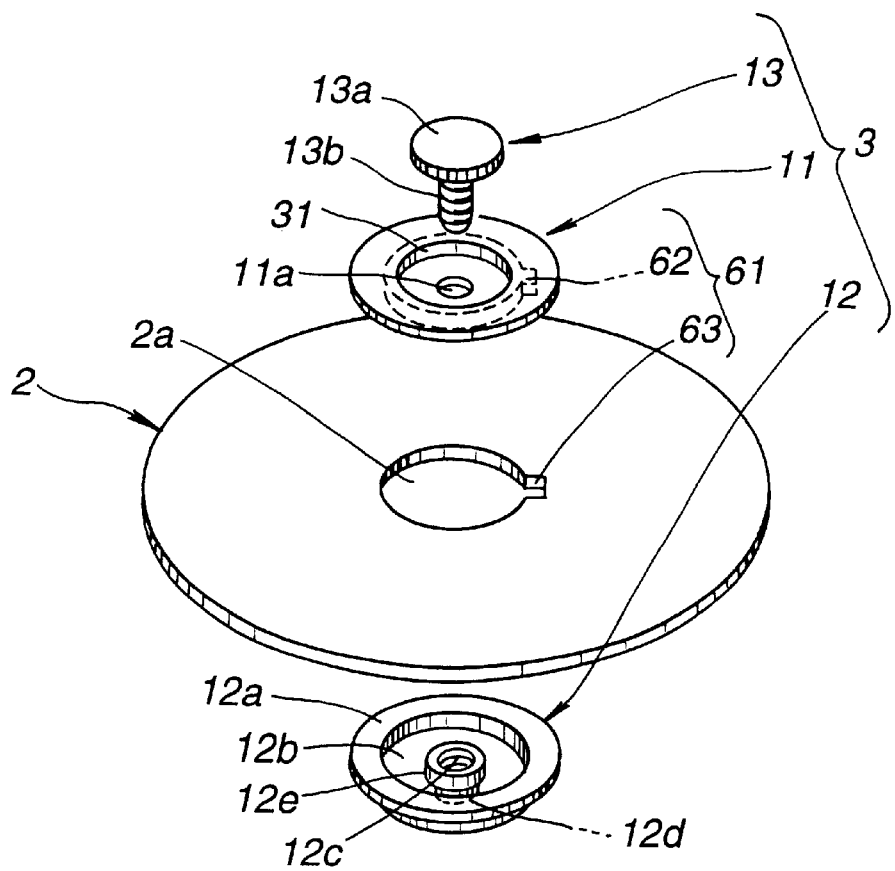
FIG. 27 is a view similar to FIG. 20, showing a twelfth embodiment of the present invention.
Figure 28:
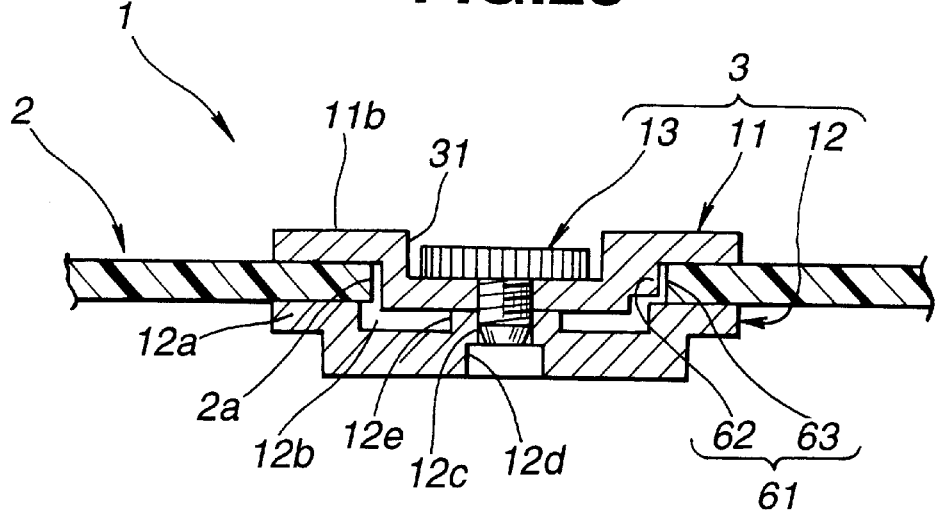
FIG. 28 is a view similar to FIG. 26, showing the disk of FIG. 27.
Figure 29:
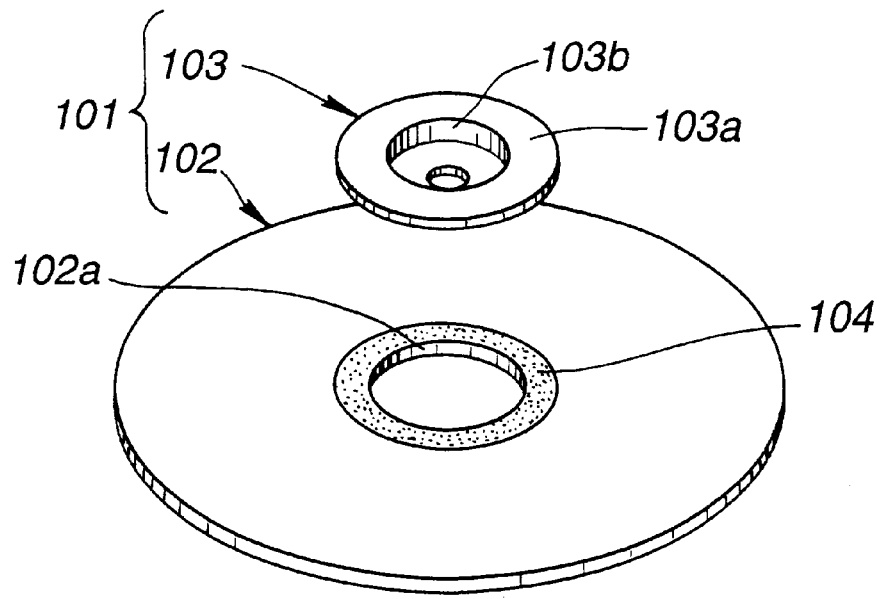
FIG. 29 is a view similar to FIG. 27, showing a known disk.
Figure 30:
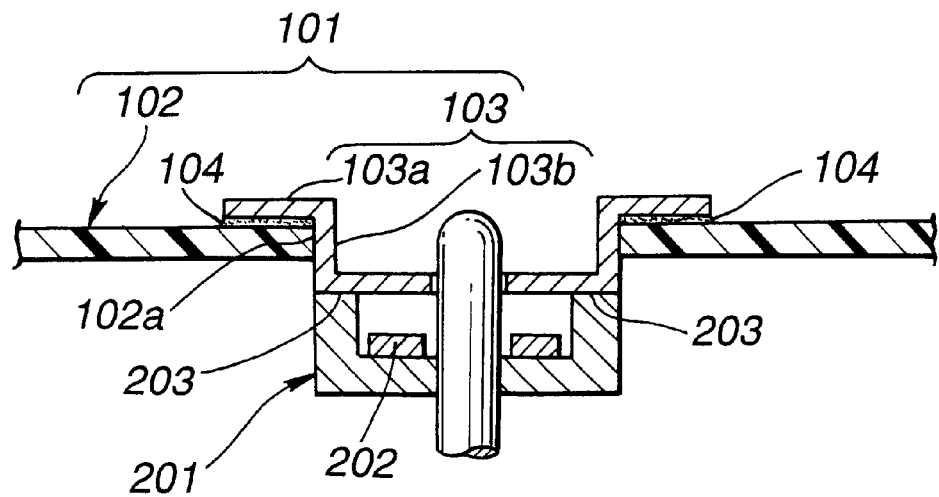
FIG. 30 is a view similar to FIG. 28, showing the known disk.

FIGS. 27–28 show a twelfth embodiment of the present invention wherein racing preventing means 61 is arranged to prevent the center hub 3 from racing with respect to the disk main body 2. The racing preventing means 61 comprises a key 62 arranged on the outer peripheral surface of the protrusion 31 of the upper hub component 11, and a key groove 63 formed in the center hole 2a of the disk main body 2. When inserting the protrusion 31 of the upper hub component 11 into the center hole 2a of the disk main body 2, the key 62 is engaged with the key groove 63 to prevent rotation or racing of the protrusion 31 in the center hole 2a.

In the twelfth embodiment, the racing preventing means 61 comprises the key 62 and the key groove 63. Alternatively, the racing preventing means 61 may be the protrusion 31 of the upper hub component 11 formed like an oval or a polygon to disable rotation or racing thereof in the center hole 2a. Moreover, when the disk 1 is constructed such that the protrusion 32 of the lower hub component 12 is inserted in the center hole 2a of the disk main body 2 as in the ninth embodiment, the racing preventing means 61 may be arranged to the disk main body 2 and the lower hub component 12.

Having described the present invention with regard to the preferred embodiments, it is noted that the present invention is not limited thereto, and various changes and modifications can be made without departing from the scope of the present invention.

What is claimed is:

1. A disk recording means adapted to a recording and reproducing device having a table, comprising:

a main body having a center hole; and a center hub mounted in said center hole of said main body, said center hub including first and second components for holding first and second sides of said main body wherein at least one of said first and second components is formed of a magnetic material and said center hub includes means for connecting said first and second components, said center hub being magnetically chucked on the table due to a number of magnets provided in the recording and reproducing device attracting the at least one component formed of a magnetic material, wherein said connecting means of said center hub includes a single screw which is inserted into a first centrally-formed insertion hole of said first component and which is engaged in a second centrally-formed insertion hole of said second component to arrange and mount said screw through the center hole of said main body.

2. A disk recording means as claimed in claim 1, further comprising means for ensuring contact between said main body and said center hub.

3. A disk recording means as claimed in claim 2, wherein said contact ensuring means include a slippage restrainer arranged between said main body and each of said first and second components of said center hub.

4. A disk recording means as claimed in claim 2, wherein said contact ensuring means include first protrusions arranged between said main body and said first component of said center hub, said first protrusions being disposed on a face of said first component opposite to said main body.

5. A disk recording means as claimed in claim 4, wherein said contact ensuring means include second protrusions arranged between said main body and said second component of said center hub, said second protrusions being disposed on a face of said second component opposite to said main body.

6. A disk recording means as claimed in claim 5, wherein said first and second protrusions are arranged to face each other.

7. A disk recording means as claimed in claim 6, wherein said first and second protrusions have different contact areas with respect to said main body.

8. A disk recording means as claimed in claim 6, wherein said first and second protrusions include an annular protrusion.

9. A disk recording means as claimed in claim 1, wherein said center hub includes a positioning protrusion engaged with said center hole of said main body.

10. A disk recording means as claimed in claim 9, wherein said positioning protrusion is formed with said first component of said center hub.

11. A disk recording means as claimed in claim 9, wherein said positioning protrusion is formed with said second component of said center hub.

12. A disk recording means as claimed in claim 1, wherein said second component of said center hub includes an annular protrusion formed on the bottom and having an end face which contacts the table.

13. A disk recording means as claimed in claim 1, wherein said second component of said center hub includes a hole formed through the bottom for receiving a spindle of the recording and reproducing device, and an annular protrusion for supporting said spindle.

14. A disk recording means adapted to a recording and reproducing device having a table, comprising:

a main body having a center hole;

a center hub mounted in said center hole of said main body, said center hub including first and second components for holding first and second sides of said main body wherein at least one of said first and second components is formed of a magnetic material and said center hub includes means for connecting said first and second components, said center hub being magnetically chucked on the table due to a number of magnets provided in the recording and reproducing device attracting the at least one component formed of a magnetic material, wherein said connecting means of said center hub includes a single fastening means which is inserted into a first centrally-formed insertion hole of said first component and which is engaged in a second centrally-formed insertion hole of said second component to arrange and mount said fastening means through the center hole of said main body; and means for ensuring contact between said main body and said center hub.

\* \* \* \* \*